(12) United States Patent
Javer et al.

(10) Patent No.: US 6,475,055 B1
(45) Date of Patent: Nov. 5, 2002

(54) CONSTRUCTION SYSTEM

(75) Inventors: Ingvar Javer; Claes Nordenstam, both of Göteborg (SE)

(73) Assignee: Megamec.com Beneficial Trust, Boston, MA (US)

( * ) Notice: Subject to any disclaimer, the term of this patent is extended or adjusted under 35 U.S.C. 154(b) by 0 days.

(21) Appl. No.: 09/720,511

(22) PCT Filed: Jun. 30, 1999

(86) PCT No.: PCT/SE99/01185

§ 371 (c)(1),
(2), (4) Date: Dec. 21, 2000

(87) PCT Pub. No.: WO00/01457

PCT Pub. Date: Jan. 13, 2000

(30) Foreign Application Priority Data

Jul. 3, 1998 (SE) .............................................. 9802383

(51) Int. Cl.[7] .............................................. A63H 33/12
(52) U.S. Cl. ........................ 446/108; 446/122; 446/124
(58) Field of Search ........................ 446/85, 108, 111, 446/112, 113, 115, 122, 123, 124, 125

(56) References Cited

U.S. PATENT DOCUMENTS 4,691,828 A  *  9/1987  Slusarczyk et al. ......... 206/509
5,611,187 A  *  3/1997  Jones ......................... 403/122
5,924,906 A  *  7/1999  Grafton ....................... 446/121

FOREIGN PATENT DOCUMENTS

| FR | 1174756 | 3/1959 |
| GB | 16858 | 4/1913 |
| GB | 461094 | 2/1937 |
| GB | 2241997 | 9/1991 |

* cited by examiner

Primary Examiner—Jacob K. Ackun
(74) Attorney, Agent, or Firm—Orum & Roth

(57) ABSTRACT

The present invention relates to a construction system (1) comprising construction elements (2) which exhibit a number of transcurrent holes (8) distributed along the aforementioned elements, connecting pieces (3) and locking devices (4) interacting with them for the purpose of connecting construction elements to one another. The aforementioned connecting pieces (3) consist of at least two threaded (5) connecting uprights (6, 7) projecting from a common connecting frame (9) which exhibit a form corresponding to the holes (8) in the construction elements, and threaded (11) connecting hats are so arranged, when screwed onto the aforementioned connecting uprights, as to clamp assembled construction elements (2) securely to an abutment (12) on the connecting piece (3) in question.

20 Claims, 12 Drawing Sheets

CONSTRUCTION SYSTEM

The present invention relates to a construction system comprising construction elements which exhibit a number of transcurrent holes distributed along the aforementioned elements, connecting pieces and locking devices interacting with them for the purpose of connecting construction elements to one another.

FR 1,174,756 A presents U-shaped fixing components (13) intended to be passed through pairs of holes (10) before being clamped securely with their elongated base part (13a) against the wall of a fixing plate (1, 2).

GB 16 858 A dating from 1912 presents an angle screw and a holder (1, 2) situated at a certain distance from the inner end piece of the thread; and GB 461 094 A and GB 2241997 A present angled and straight bolts for the connection of different parts respectively in parallel with and at an angle to one another.

No mention is made, however, of the positioning and the nature of an abutment and the linking of the connecting frame between the aforementioned threaded connecting uprights for the purpose of achieving strong construction elements which exhibit a varying function.

The principal object of the present invention is, in the first instance, to provide a simple and flexible construction system which is suitable for use in the construction of objects of varying kinds, such as toys, toy tools, training items, scaffoldings and furniture, etc.

The aforementioned object is achieved by means of construction system in accordance with the present invention, which is characterized essentially in that the aforementioned connecting pieces consist of at least two threaded connecting uprights projecting from a common connecting frame which exhibit a form corresponding to the holes in the construction elements, in that locking devices executed as threaded connecting hats are so arranged, when screwed onto the aforementioned connecting uprights, as to clamp assembled construction elements securely to an abutment on the connecting piece in question, and in that the connecting pieces are in the form of triangular connecting frames with abutment surfaces and with connecting uprights extending perpendicularly outwards from the respective abutment surface.

The invention is described below as a number of preferred illustrative embodiments, in conjunction with which reference is made to accompanying drawings, in which.

Figure 1:
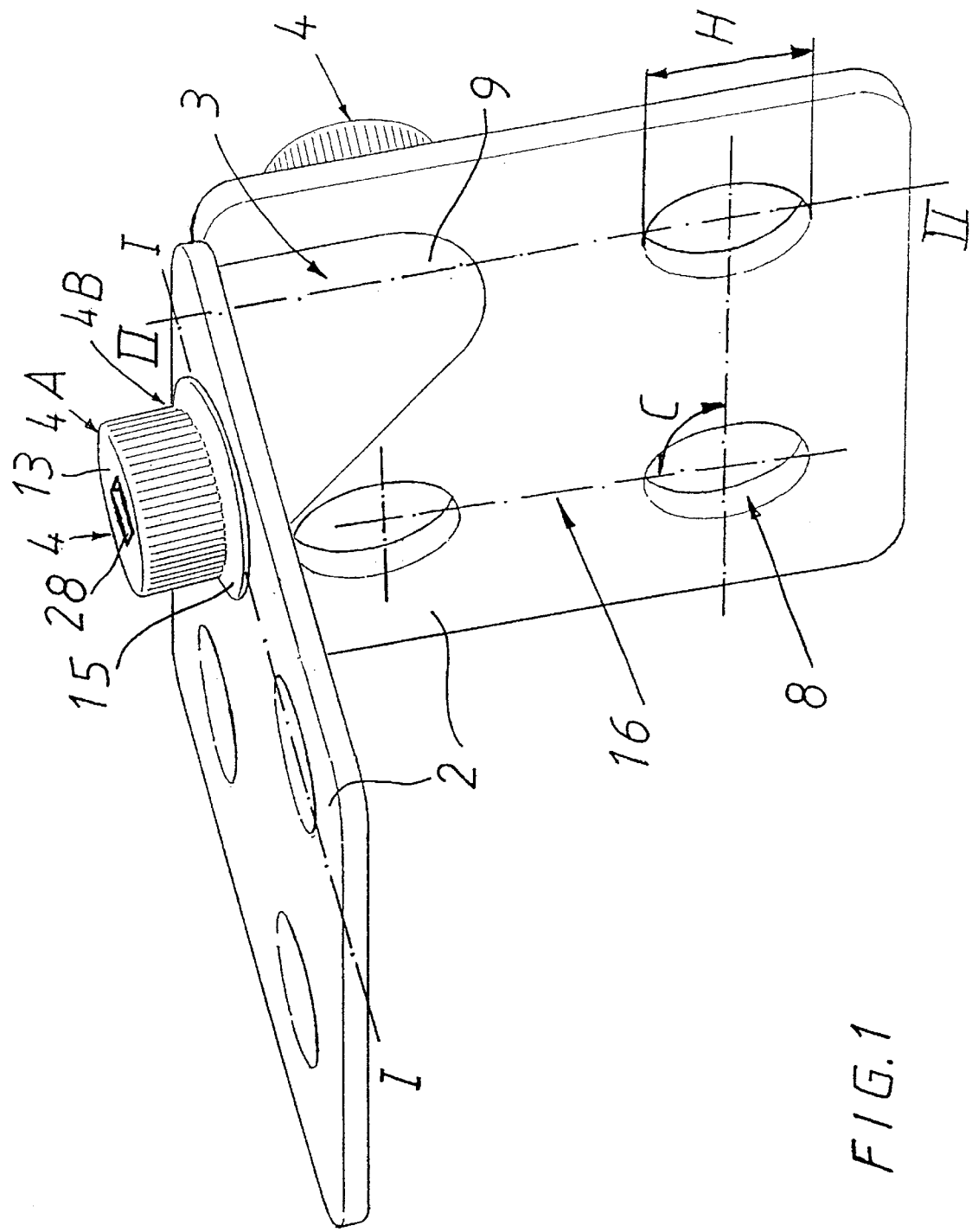
FIG. 1 shows a perspective view of two connected construction elements with an interjacent connecting piece.
Figure 2:
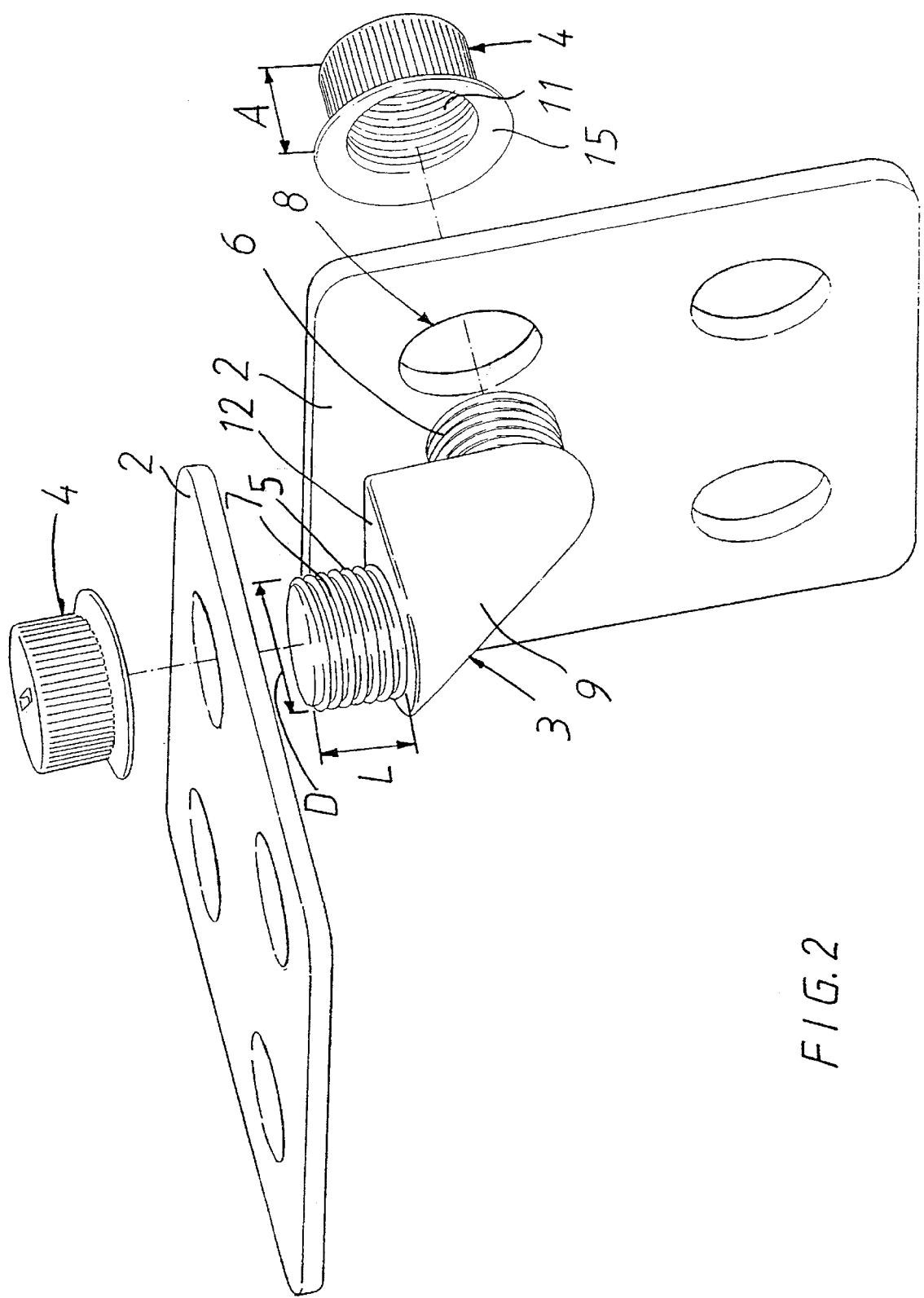
FIG. 2 shows an exploded drawing prior to the connection of the constituent parts.

A construction system 1 comprising a desired number of construction elements 2, $2^1$, $2^2$, $2^3$, $2^4$, $2^5$ ... and so on, which may be of varying form and may exhibit a number of transcurrent holes 8 distributed along the aforementioned elements, a number of connecting pieces 3, $3^1$, $3^2$, $3^3$, and locking devices 4 interacting therewith, which are so arranged as to connect the aforementioned connecting elements to one another, have their connecting pieces 3–$3^3$ arranged in a certain way. More specifically, the aforementioned connecting pieces consist of at least two connecting uprights 6, 7 projecting from a common connecting frame 9, which uprights exhibit external threads 5, see FIGS. 1–8 and 10, and exhibit a form corresponding to the holes 8 in the construction elements. The locking devices, which are executed as locking hats 4, which exhibit internal threads 11 matching the external threads 5 on the connecting uprights 6, 7, are so arranged, when screwed onto the aforementioned connecting uprights 6, 7, as to clamp construction elements 2–$2^5$ assembled into a desired form to an abutment 12 on the connecting piece 3–$3^3$ in question.

As illustrated in the drawings, the connecting pieces 3, which have two connecting uprights 6, 7, are formed by triangular connecting frames 9 with or without extra reinforcements 17, e.g. in the form of external grooves, with curved abutment surfaces 12 and with connecting uprights 6, 7, 19 extending perpendicularly outwards from the respective abutment surface 12.

The connecting pieces 3–$3^3$ and the connecting hats 4 appropriately consist of blow-moulded or injection-moulded pieces of plastic material, although they may also consist of some other material produced by some other previously disclosed moulding method.

The threads 5 on the connecting uprights 6, 7 and the internal threads 11 in the connecting hats 4 extend for the entire length L, A of the respective connecting upright 6, 7 and connecting hat 4.

The external diameter D of the connecting uprights 6, 7 and the hole diameter H of the holes 8 in the construction elements 2–$2^5$ essentially correspond to one another.

Figure 9A:
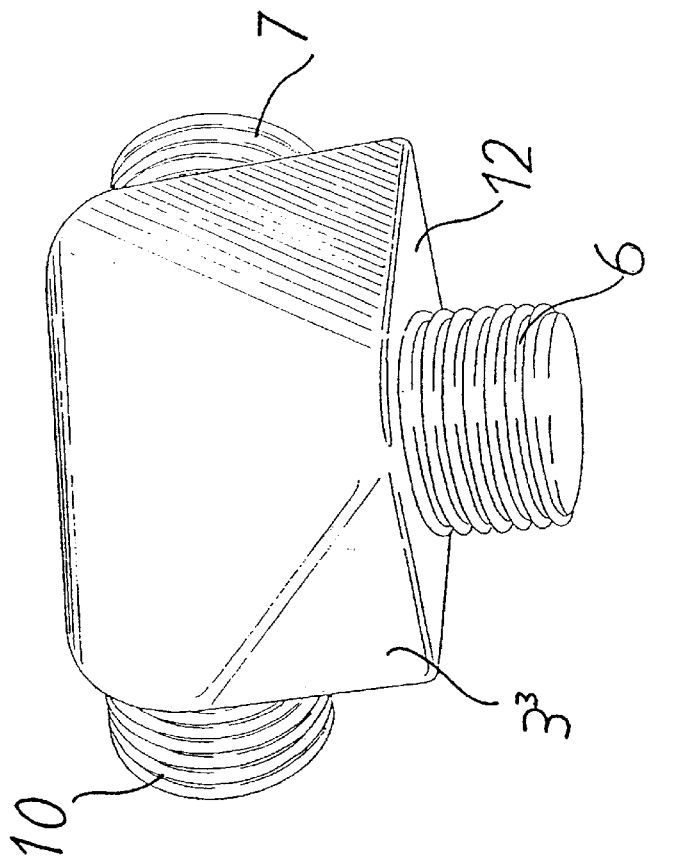
FIGS. 9 and 9A show an example of a connecting piece which permits the connection of construction elements in three different directions.
Figure 9:
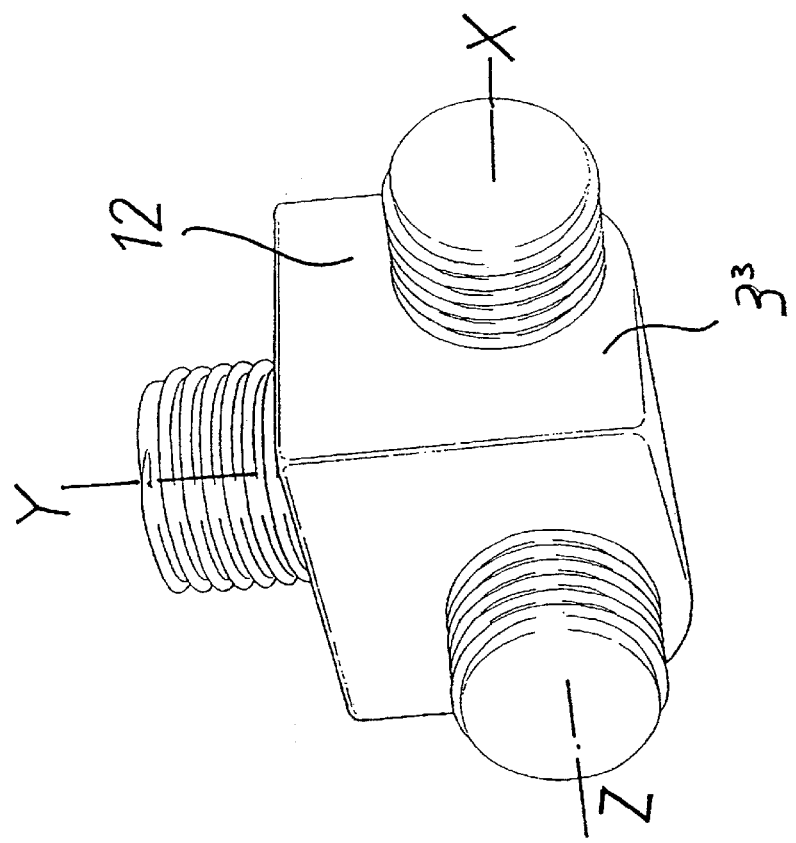

The aforementioned connecting uprights 6, 7 extend perpendicularly and/or at an oblique or acute angle X from one another. FIGS. 9, 9A show how three connecting uprights 6, 7, 10 depart from a common connecting piece $3^3$, are perpendicular in relation to one another along X, Y and Z axes, and are thus particularly suitable for connecting together components at corners, i.e. for use in corner joints.

Each of the aforementioned connecting hats 4 preferably exhibits its own recess 28 or other unevenness on its closing cover 13 at the rear end 4A of the hat, corresponding to a rotating tool 14, for example a screwdriver or a hexagon socket screw key, etc. It is possible in this way effectively to tighten and, naturally, also to slacken the aforementioned hats 4. In order to provide pretension between the hats 4 and the construction elements 2, the hats 4 may exhibit a flexible peripheral edge 15 extending around the periphery of the hat at the front 4B of the hat.

The aforementioned connecting holes 8 in the construction elements 2 are distributed in a row 16 and at an angle C in relation to one another.

Figure 11:
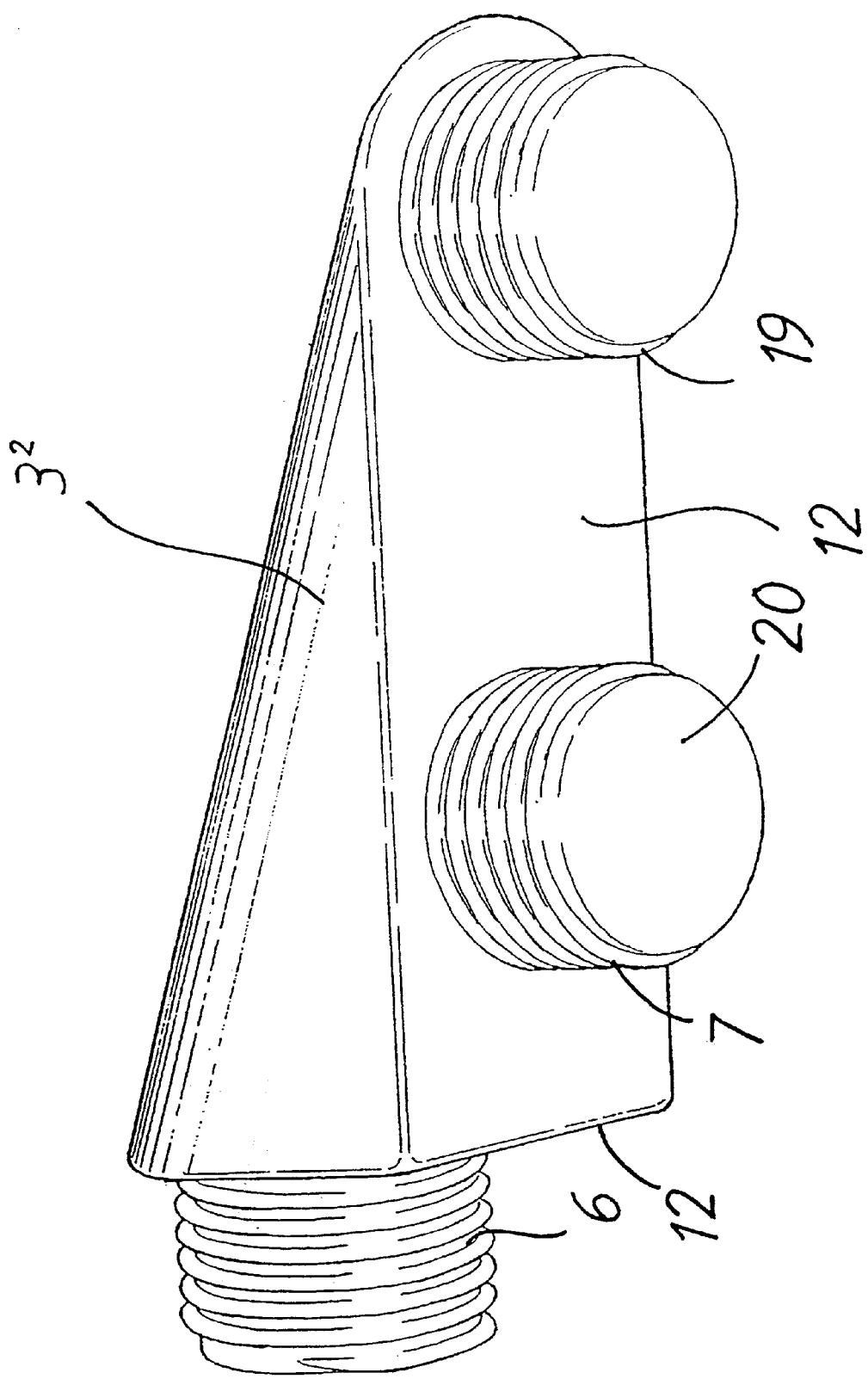
FIG. 11 shows a perspective view of a specially executed design of a connecting piece.
Figure 12:
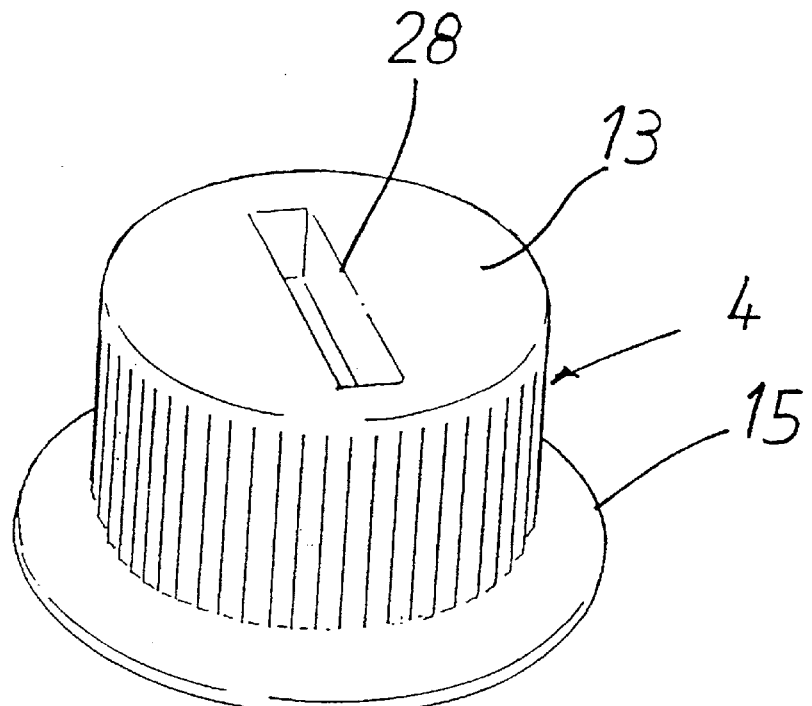
FIGS. 12 and 12A show an example of a locking device viewed at an angle from above and at an angle from below.
Figure 12A:
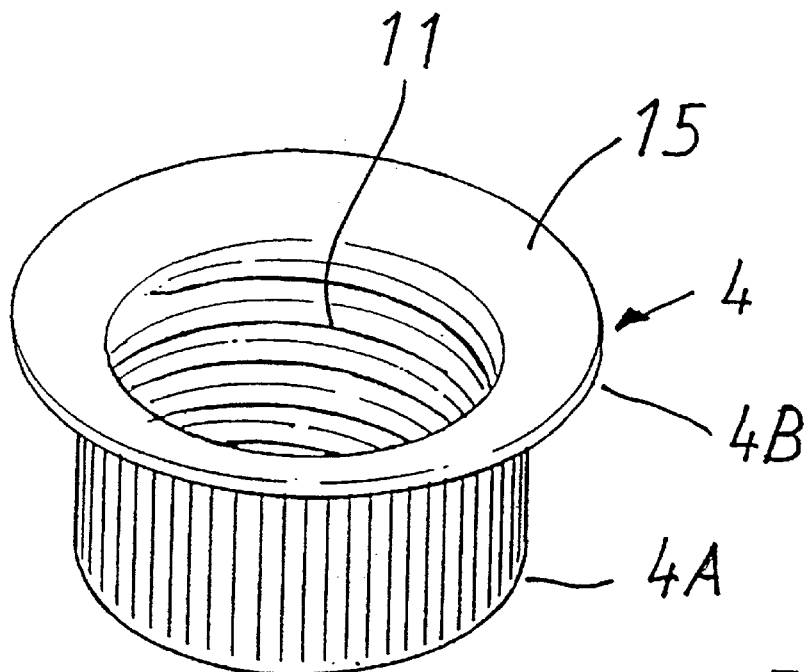

FIG. 11 shows an example of a connecting piece $3^2$, in which an extra connecting upright 19 is present on one extended abutment surface 12 of the connecting piece, whereby staying is achieved without the need to make use of a number of connecting pieces.

Figure 10A:
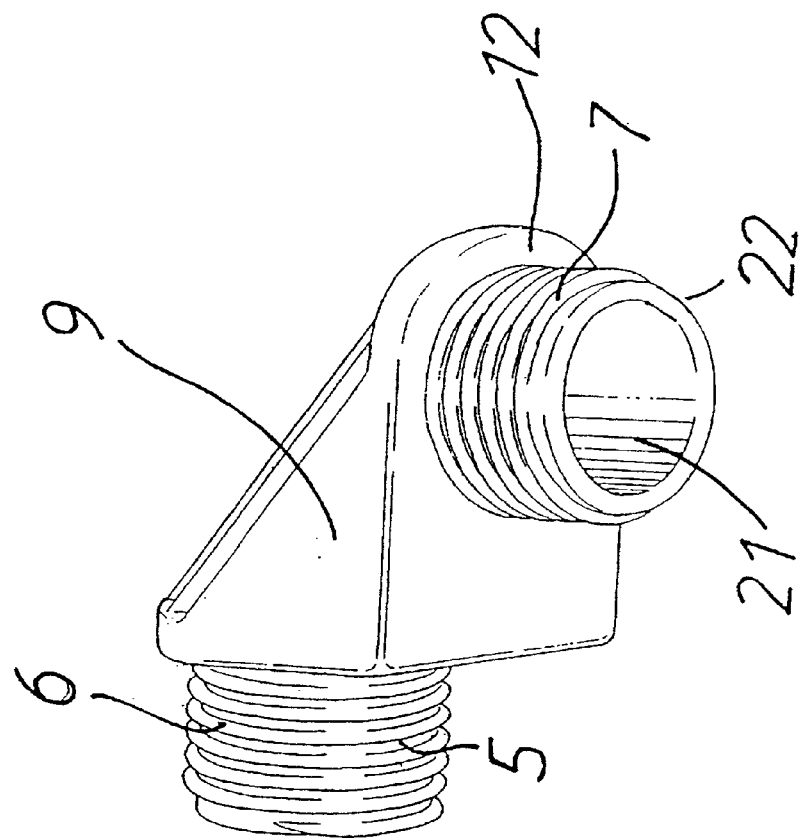
FIGS. 10 and 10A show an example of a connecting piece which permits the connection of construction elements at right angles in relation to one another.
Figure 10:
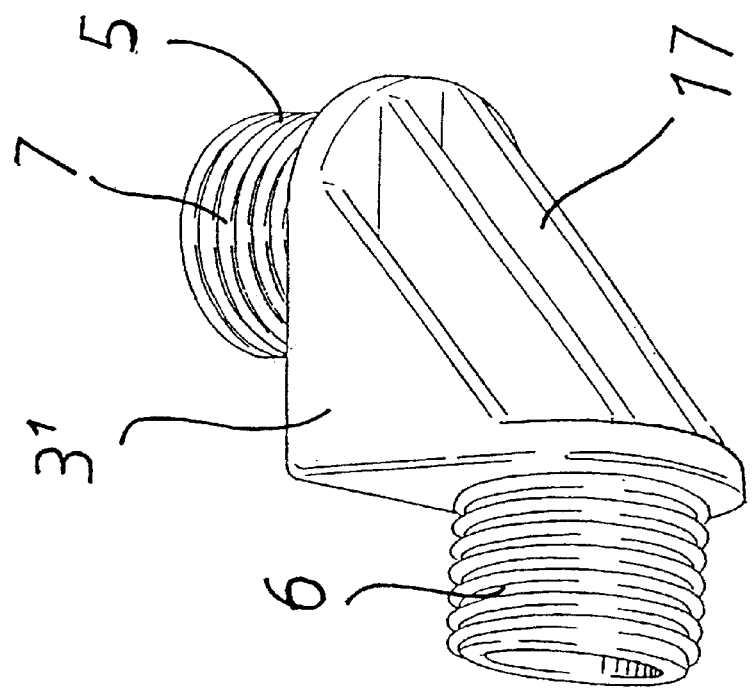

Finally, the aforementioned FIG. 11 shows, among other things, how the ends of the aforementioned connecting uprights 6, 7, 19 are closed by means of caps 20 in the form of solid walls, whereas FIGS. 10 and 10A show how the ends of the connecting pieces 6, 7 are open 22 into their inner space 21.

Figure 3:
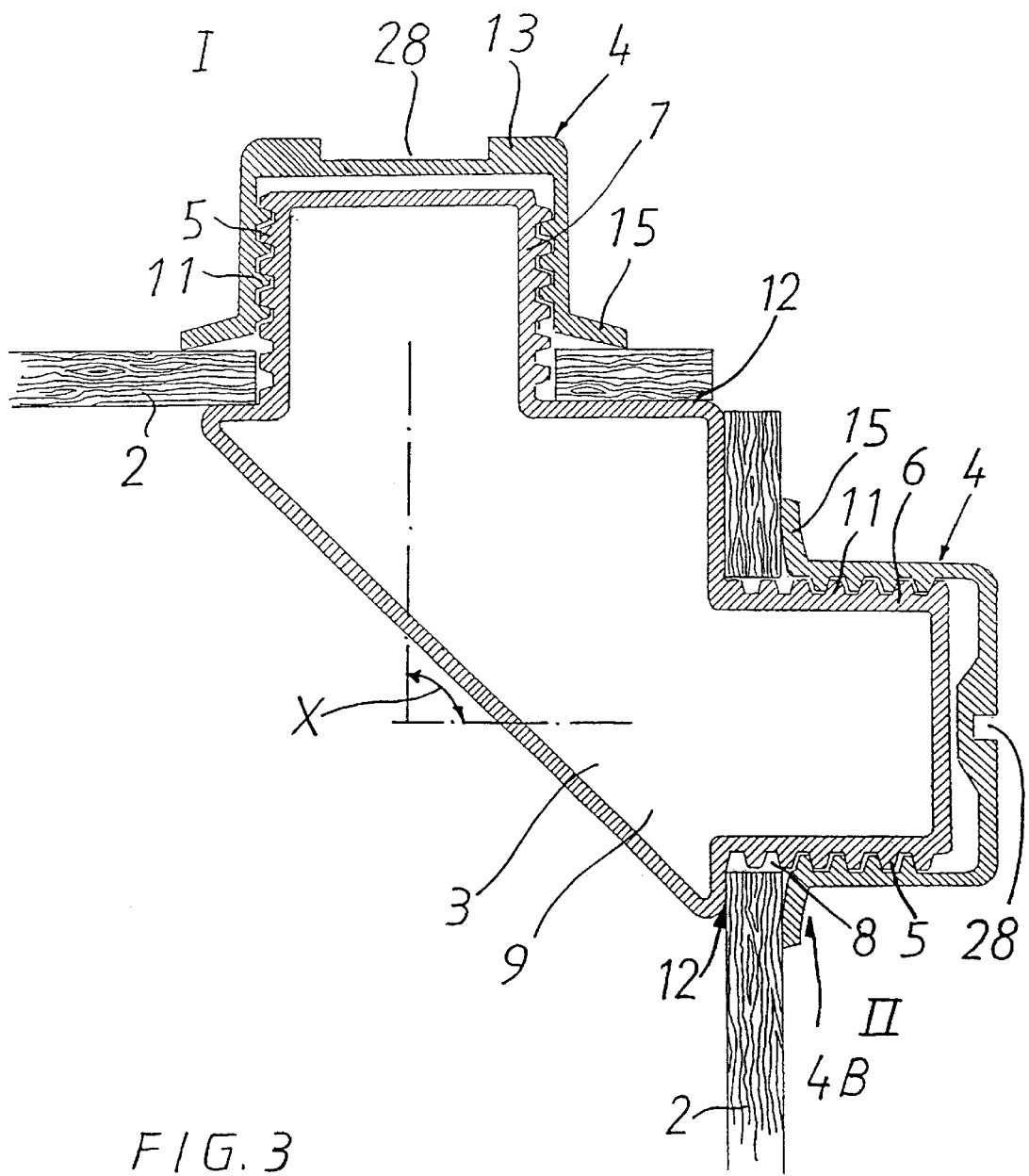
FIG. 3 shows a sectioned view along the lines I—I, II—II in FIG. 1.

The invention and its constituent parts have now been described and presented in detail, and the function should already have been appreciated. The principle of the connection is illustrated in FIG. 3, which also shows how clamping takes place by means of the hat 4 against the construction element 2, which in turn is securely clamped to the associated abutment surface 12 of the connecting piece, as the hat 4 is rotated into place with its internal threads 11 on the external threads 5 of the associated connecting upright 6, 7. The connecting upright 7 illustrated in sequence I in FIG. 3 has its hat 4 only partly tightened, which can be appreciated from the fact that its brim-like peripheral edge 15 is not in contact with any great force with the subjacent construction element 2, whereas the connecting upright 6 illustrated in sequence II in FIG. 3 and its supporting hat 4 is tightened to its maximum extent, which means that the aforementioned peripheral edge 15 of the hat has sprung outwards, and that the hat is pressing against the subjacent construction element 2. This can be appreciated from the fact that the threads have been utilized to a further extent in tightening case II than in tightening case I.

Figure 4:
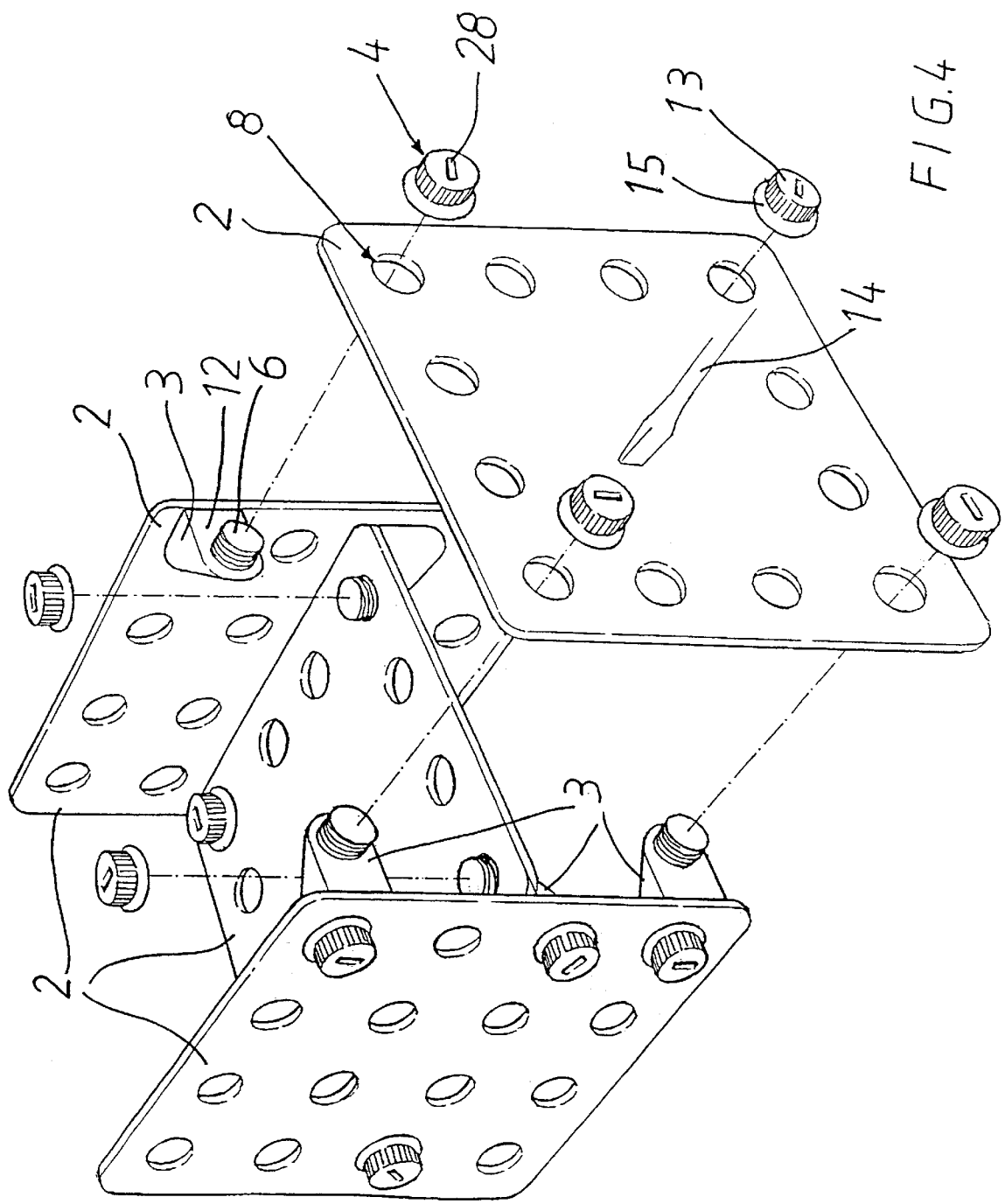
FIG. 4 shows a procedural drawing for the connection of the parts to one another.
Figure 5:
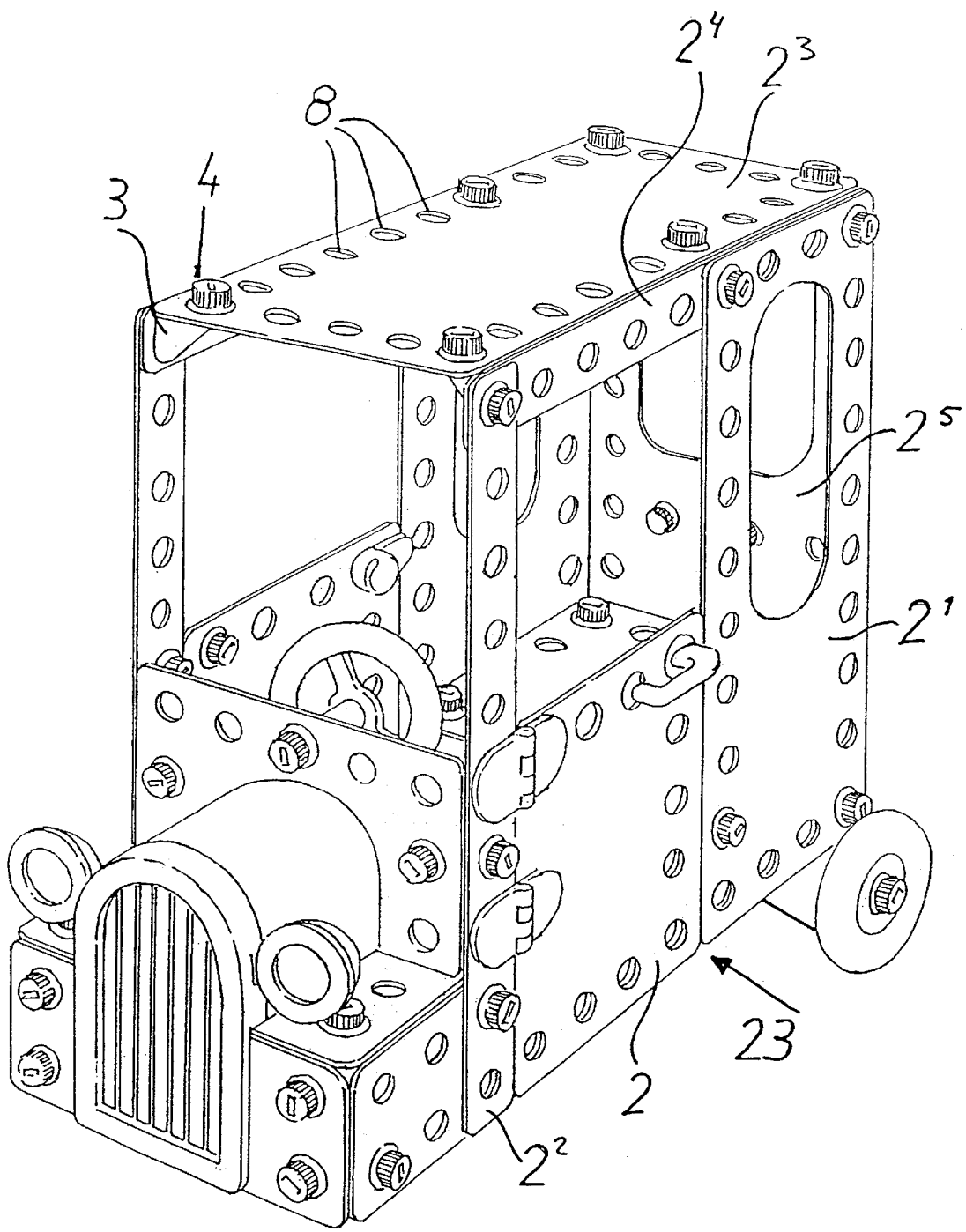
FIG. 5 shows an example of the application of the invention for the assembly of a toy car illustrated at an angle viewed from above.
Figure 6:
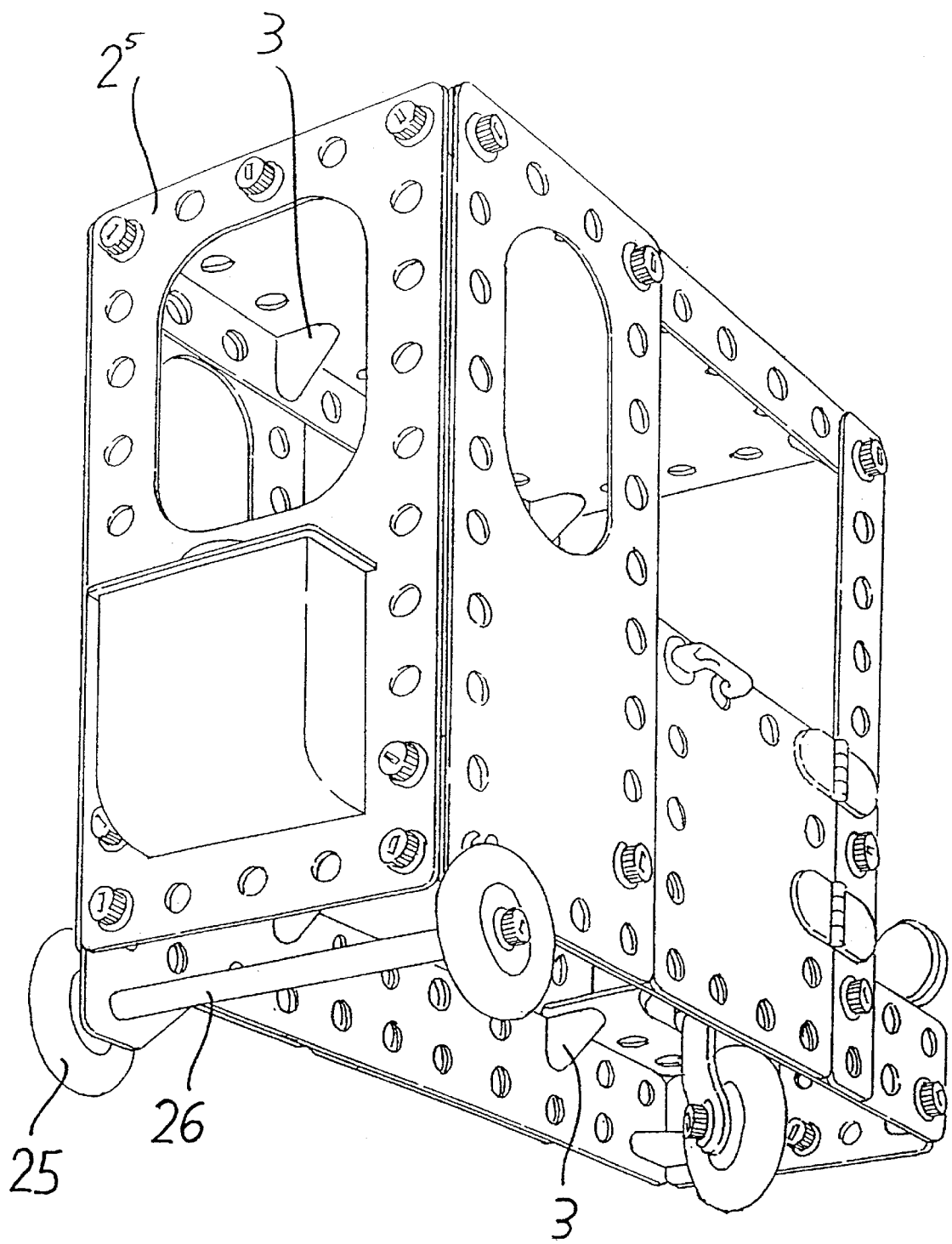
FIG. 6 shows the aforementioned toy car viewed at an angle from below.
Figure 7:
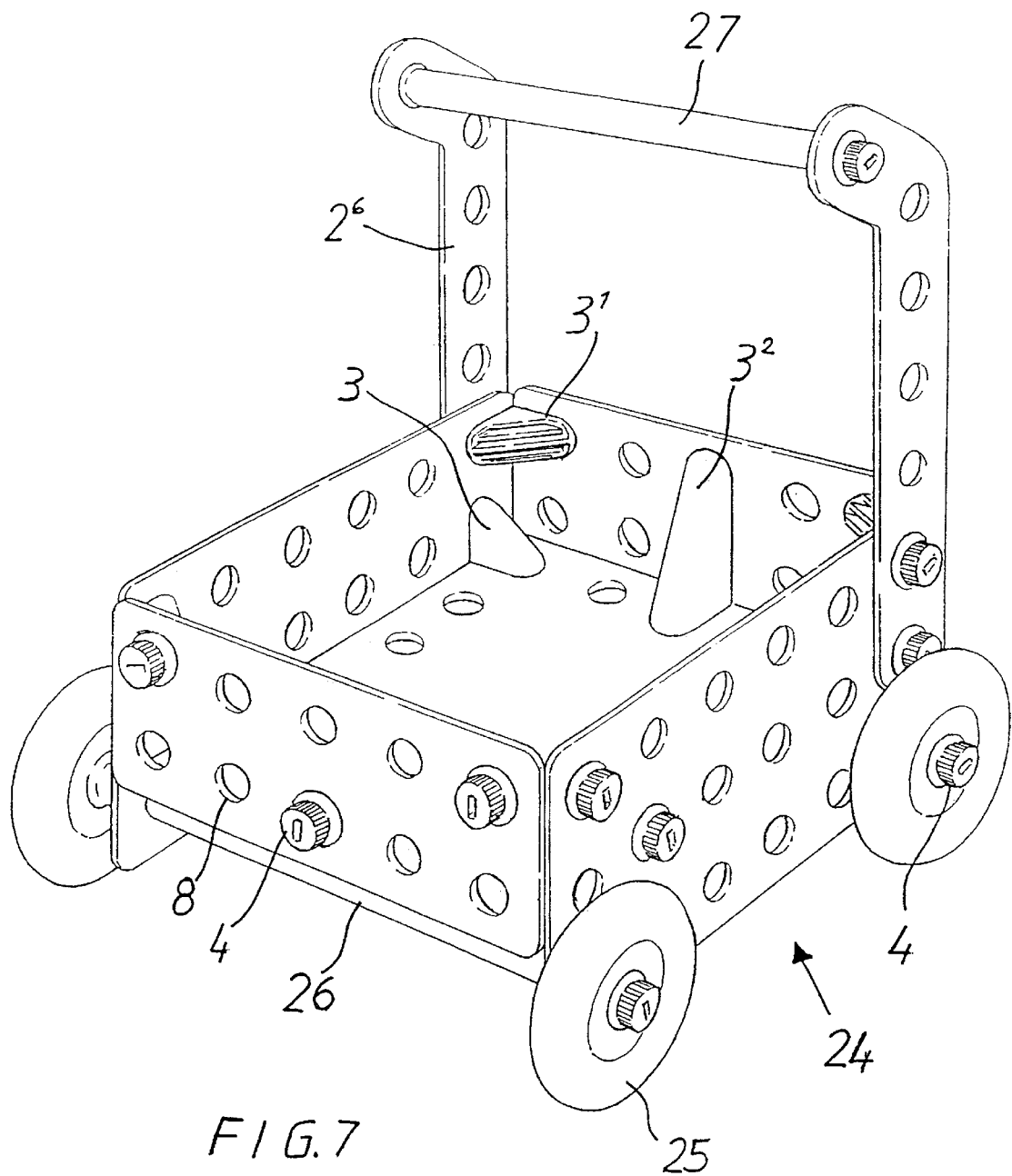
FIG. 7 shows the invention applied to the construction of a go-kart illustrated at an angle viewed from above.
Figure 8:
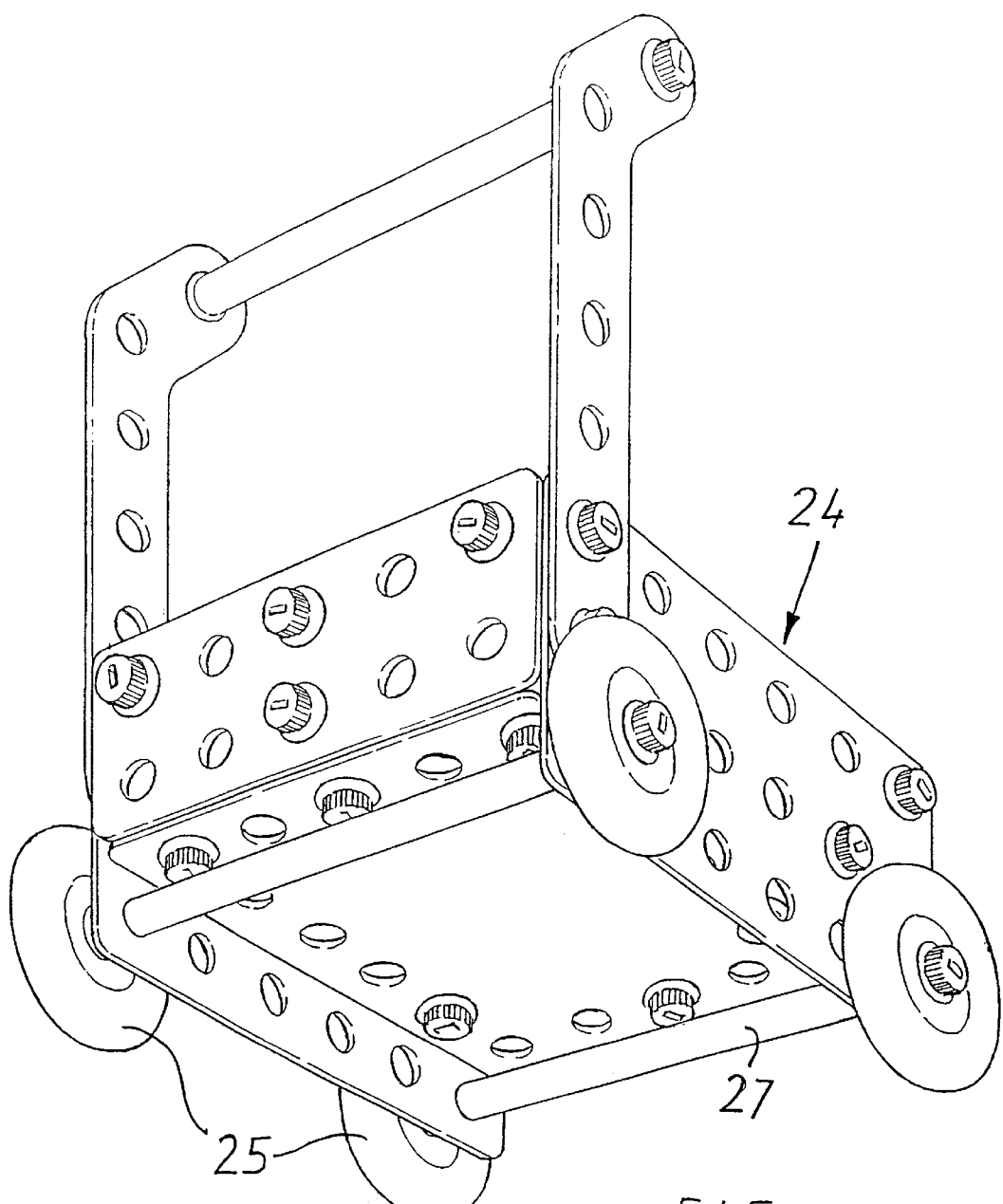
FIG. 8 shows the go-kart viewed at an angle from below.

It can be seen from FIG. 4 how the various components must be assembled and screwed together in order to produce the intended object; see also FIGS. 5–8, where a completed toy car 23 and a go-kart 24 are illustrated. Wheels 25 have been attached in this case with the help of long, rotating axles 26 and hats 4, and a handle 27 is capable of attachment to upright supports $2^6$. Holes 8 in the construction elements 2 . . . can be used in this case for the aforementioned attachment by passing the axles 26, 27 through the holes 8.

The construction elements 2 . . . may be in the form of sheets consisting of fibrous material such as sheets of masonite, plywood or particle board, or of metal, plastic or composite materials.

The locking devices 4 may be in the form of blow-moulded or injection-moulded plastics, for example nylon.

The invention is not restricted to the illustrative embodiments described above and illustrated in the drawings, but may be varied within the scope of the Patent Claims without departing from the idea of invention.

What is claimed is:

1. A construction system (1) comprising construction elements (2, $2^1$, $2^2$, $2^3$, $2^4$, $2^5$) which exhibits a number of transcurrent holes (8) distributed along the construction elements, connecting pieces (3, $3^1$, $3^2$, $3^3$) and locking devices (4), characterized in that the connecting pieces (3, $3^1$, $3^2$, $3^3$) consist of at least two threaded connecting uprights (6, 7) projecting from a common connecting frame (9) which exhibit a form corresponding to the holes (8) in the construction elements, the locking devices are threaded (11) connecting hats (4), when the locking devices are screwed onto the connecting uprights the connecting pieces clamp assembled construction elements ($2-2^5$) securely to an abutment (12) on the connecting piece ($3-3^3$), the connecting pieces (3) are in the form of triangular connecting frames (9) with abutment surfaces (12) and with connecting uprights (6, 7, 19) extending perpendicularly outwards from the abutment surface (12).

2. Construction system in accordance with Patent claim 1, characterized in that the connecting pieces ($3-3^3$) and the connecting hats (4) consist of blow-moulded pieces.

3. Construction system in accordance with claim 1, characterized in that the threads (5) on the connecting uprights (6, 7) extend for an entire length (L) of the connecting uprights.

4. Construction system in accordance with claim 2, characterized in that an external diameter (D) of the connecting uprights (6, 7) and a hole diameter (H) of the holes (8) in the construction elements ($2-2^5$) correspond to one another.

5. Construction system in accordance with claim 1, characterized in that the connecting uprights (6, 7) extend at an angle (X) from one another.

6. Construction system in accordance with claim 1, characterized in that the locking devices (4) exhibit a recess (28) corresponding to a rotating tool (14) on its closing cover (13) at a rear end (4A) of the locking device (4).

7. Construction system in accordance with claim 2, characterized in that the locking devices (4) exhibit a flexible peripheral edge (15) extending around the periphery of the locking device at the front (4B) of the locking device.

8. Construction system in accordance with claim 1, characterized in that the connecting holes (8) in the construction elements (2) are distributed in a row (16) and at an angle (C) in relation to one another.

9. Construction system in accordance with claim 1, characterized in that the ends of the connecting uprights (6, 7) are one of closed (20) and open 22.

10. Construction system in accordance with claims 1, characterized in that the abutment surfaces (12) are curved.

11. Construction system in accordance with claim 1, characterized in that the abutment surfaces (12) are situated at the inner ends of the external threads (5).

12. Construction system in accordance with Patent claim 1, characterized in that the connecting pieces ($3-3^3$) consist of injection-moulded pieces.

13. Construction system in accordance with claim 2, characterized in that the threads (5) on the connecting uprights (6, 7) extend for an entire length (L) of the connecting uprights.

14. Construction system in accordance with claim 2, characterized in that an external diameter (D) of the connecting uprights (6, 7) and a hole diameter (H) of the holes (8) in the construction elements $2-2^5$ correspond to one another.

15. Construction system in accordance with claim 2, characterized in that the connecting uprights (6, 7) extend at an angle (X) from one another.

16. Construction system in accordance with claim 2, characterized in that the locking devices (4) exhibit a recess (28) corresponding to a rotating tool (14) on its closing cover (13) at a rear end (4A) of the (4).

17. Construction system in accordance with claim 2, characterized in that the locking devices (4) exhibit a flexible peripheral edge (15) extending around the periphery of the locking device at the front (4B) of the locking device.

18. Construction system in accordance with claim 2, characterized in that the connecting holes (8) in the construction elements (2) are distributed in a row (16) and at an angle (C) in relation to one another.

19. Construction system in accordance with claim 2, characterized in that the ends of the connecting uprights (6, 7) are one of closed (20) and open (22).

20. Construction system in accordance with claim 2, characterized in that the abutment surfaces (12) are curved.

* * * * *